US010550677B2

(12) United States Patent
Howell et al.

(10) Patent No.: US 10,550,677 B2
(45) Date of Patent: Feb. 4, 2020

(54) ADJUSTABLE UP THRUST BEARING

(71) Applicant: GE Oil & Gas ESP, Inc., Oklahoma City, OK (US)

(72) Inventors: Steven Alan Howell, Oklahoma City, OK (US); Aaron Noakes, Norman, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 237 days.

(21) Appl. No.: 15/493,004

(22) Filed: Apr. 20, 2017

(65) Prior Publication Data

US 2018/0306245 A1 Oct. 25, 2018

(51) Int. Cl.
*F04D 13/08* (2006.01)
*E21B 43/12* (2006.01)

(52) U.S. Cl.
CPC .................. *E21B 43/128* (2013.01)

(58) Field of Classification Search
CPC .......... F16C 17/04; F16C 39/02; E21B 4/003; E21B 43/128; F04D 13/08; F04D 29/0413; F04D 13/10; F04D 29/047; F04D 13/06; F04D 29/041
See application file for complete search history.

(56) References Cited

U.S. PATENT DOCUMENTS

| 3,238,879 | A | * | 3/1966 | Shallenberg | F04D 13/10 415/131 |
| 3,326,612 | A | * | 6/1967 | Schaefer | F16C 41/02 384/304 |
| 4,198,104 | A | | 4/1980 | Crase | |
| 4,199,201 | A | | 4/1980 | Trzeciak | |
| 4,240,683 | A | * | 12/1980 | Crase | E21B 4/003 175/320 |
| 5,667,314 | A | | 9/1997 | Limanowka et al. | |
| 9,528,357 | B2 | * | 12/2016 | Du | E21B 43/128 |
| 2002/0196988 | A1 | * | 12/2002 | Tsui | F04D 13/08 384/121 |
| 2010/0078177 | A1 | * | 4/2010 | Parmeter | E21B 43/128 166/369 |
| 2015/0118067 | A1 | | 4/2015 | Childs et al. | |
| 2015/0354582 | A1 | * | 12/2015 | Tanner | F04D 13/08 415/1 |
| 2018/0112475 | A1 | * | 4/2018 | Scekic | E21B 19/06 |

OTHER PUBLICATIONS

Mpact Downhole Motors Sets Drilling Record, Oil & Gas Product News, Dec. 20, 2010, (http://www.oilandgasproductnews.com/article/968/mpact-downhole-motors-sets-drilling-record).

* cited by examiner

*Primary Examiner* — Kipp C Wallace
(74) *Attorney, Agent, or Firm* — Crowe & Dunlevy, P.C.

(57) ABSTRACT

A pumping system includes a motor, a shaft driven by the motor, a pump driven by shaft, a thrust bearing housing and a thrust bearing assembly contained within the thrust bearing housing. The thrust bearing assembly includes a rotating component connected to the shaft, a first bearing adjacent to the rotating component and an adjustment mechanism for the adjusting the distance between the rotating component and the first bearing. The adjustment mechanism can be externally manipulated from outside the thrust bearing housing.

18 Claims, 4 Drawing Sheets

ADJUSTABLE UP THRUST BEARING

FIELD OF THE INVENTION

This invention relates generally to the field of submersible pumping systems, and more particularly, but not by way of limitation, to a seal section with an improved up thrust bearing.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system is engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Many seal sections employ seal bags, labyrinth chambers and other separation mechanism to accommodate the volumetric changes and movement of fluid in the seal section while providing a positive barrier between clean lubricant and contaminated wellbore fluid.

Because most seal sections include one or more rotating shafts that transfer torque from the motor to the pump, the fluid separation mechanisms in the seal section must be configured to accommodate the shaft. Mechanical shaft seals are commonly placed around the shaft to prevent fluids from migrating along the shaft. Generally, a mechanical seal includes components that provide a structural barrier against fluid migration. A popular design of mechanical seals employs a spring-loaded runner connected to the shaft that is forced against a stationary ring. The contact between the rotating runner and stationary ring creates a seal that prevents the unwanted migration of fluids beyond the shaft seal.

While generally acceptable, prior art mechanical seals may be susceptible to failure under certain conditions. In particular, if the shaft is permitted excessive axial (lateral) movement during operation of the pumping system, the motion may exceed the compensation provided by the spring or bellows and the rotating runner may be lifted off the face of the stationary ring. When the runner separates from the stationary ring, the shaft seal may permit unwanted fluids to pass into previously isolated regions of the seal section.

A thrust bearing assembly is used to limit the amount of axial movement in the shaft. The thrust bearing assembly typically includes a thrust runner that is keyed to the shaft and positioned between two stationary thrust bearings. The thrust bearing assembly must be precisely manufactured and assembled to achieve the desired spacing between the thrust runner and the thrust bearings. Unfortunately, once the seal section has been assembled, it is difficult to test the tolerance provided by the thrust bearing assembly. Moreover, prior art thrust bearing assemblies cannot be adjusted after the seal section has been assembled. There is, therefore, a need for an improved thrust bearing assembly that overcomes these other deficiencies in the prior art. It is to these and other objects that the present invention is directed.

SUMMARY OF THE INVENTION

In one aspect, some of the present embodiments provide a seal section for use in a downhole submersible pumping system. The seal section includes a shaft, one or more shaft seals disposed along the shaft and a thrust bearing assembly. The thrust bearing assembly includes a thrust runner connected to the shaft, an up thrust bearing adjacent to the thrust runner and an adjustment mechanism for the adjusting the distance between the up thrust bearing and the thrust runner.

In another aspect, the present embodiments provide a pumping system that includes a motor, a shaft driven by the motor, a pump driven by shaft, a thrust bearing housing and a thrust bearing assembly contained within the thrust bearing housing. The thrust bearing assembly includes a rotating component connected to the shaft, a first bearing adjacent to the rotating component and an adjustment mechanism for the adjusting the distance between the rotating component and the first bearing. The adjustment mechanism can be manipulated from outside the thrust bearing housing.

In yet another aspect, the present embodiments include a seal section for use in a downhole submersible pumping system, where the seal section includes a shaft, one or more shaft seals disposed along the shaft and a thrust bearing assembly. The thrust bearing assembly includes a thrust runner connected to the shaft, an up thrust bearing adjacent to the thrust runner and adjustment means for adjusting the distance between the up thrust bearing and the thrust runner.

WRITTEN DESCRIPTION

Figure 1:
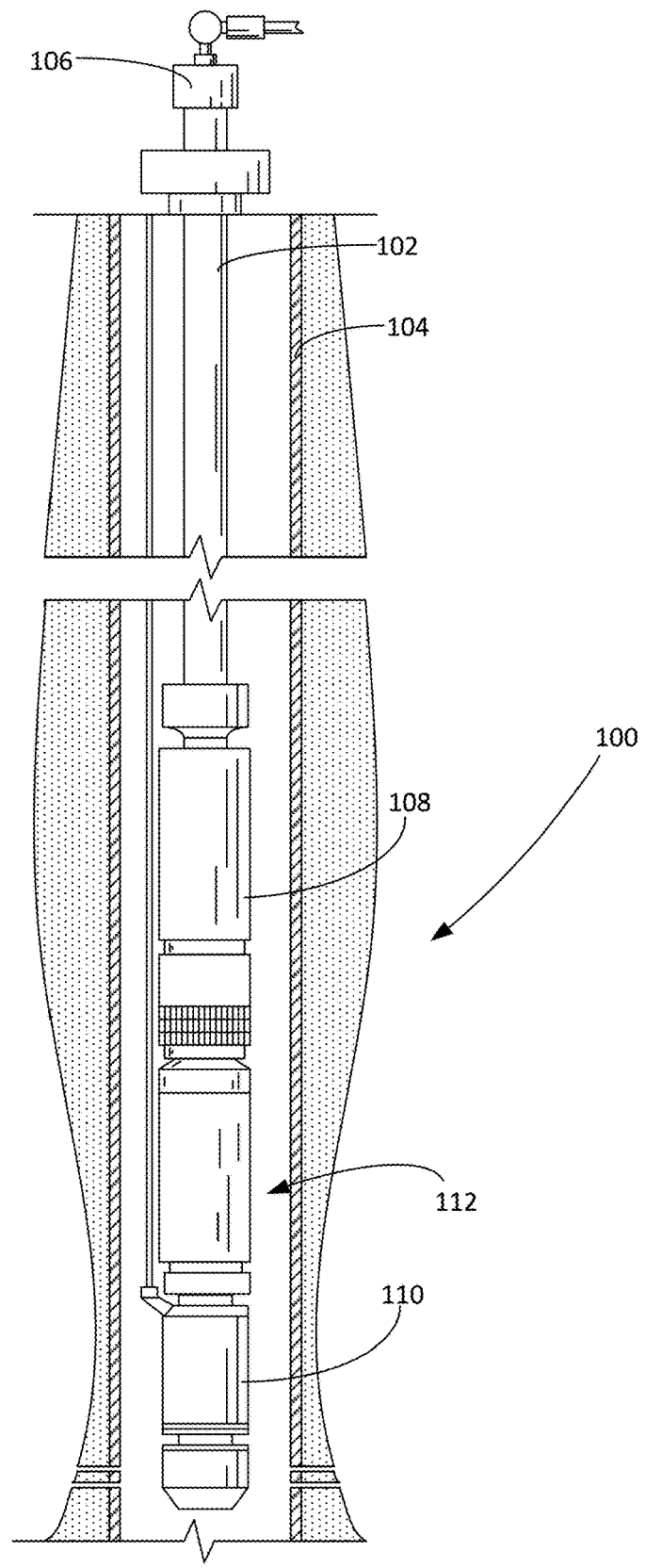
FIG. 1 is an elevational view of a submersible pumping system.

FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations. Although the pumping system 100 is depicted in a vertical wellbore 104, it will be appreciated that the pumping system 100 may also be deployed in a deviated, horizontal or other non-vertical wellbore.

The pumping system 100 includes a pump assembly 108, a motor assembly 110 and a seal section 112. In some embodiments, the motor assembly 110 is an electrical motor that receives power from a surface-mounted motor control unit (not shown). When energized, the motor assembly 110 drives a shaft that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. It may be desirable to use tandem-motor combinations, multiple seal sections, multiple pump assemblies or other downhole components not shown in FIG. 1. For example, in certain applications it may be desirable to place a seal section 112 below the motor assembly 110.

Figure 2:
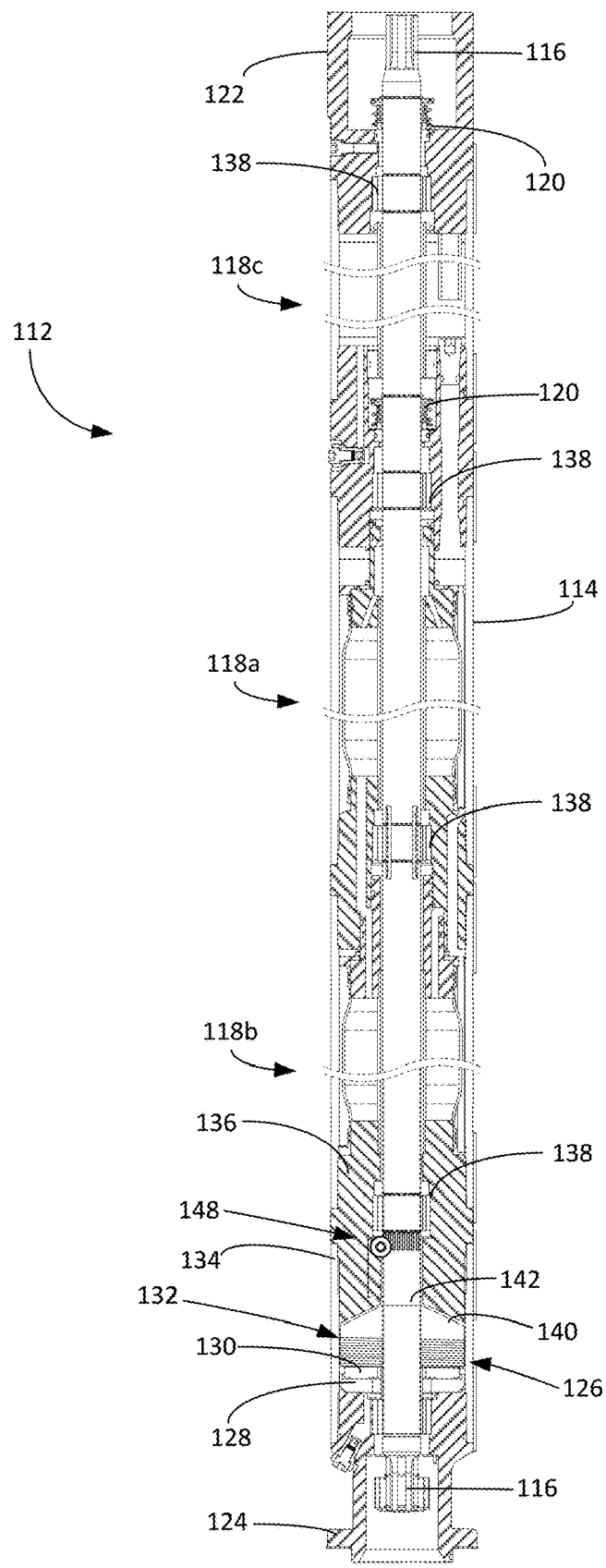
FIG. 2 is a cross-sectional view of the seal section from the submersible pumping system of FIG. 1.

Referring now to FIG. 2, shown therein is a cross-sectional view of the seal section 112. The seal section 112 includes a housing 114, a shaft 116, and one or more fluid separation mechanisms. As depicted in FIG. 2, the fluid separation mechanisms include a first seal bag assembly 118a, a second seal bag assembly 118b (collectively "seal bag assemblies 118") and a labyrinth chamber 118c. The shaft 116 transfers mechanical energy from the motor assembly 110 to the pump assembly 108. The housing 114 is configured to protect the internal components of the seal section 112 from the exterior wellbore environment. Other separation mechanisms may be used in addition to, or as an alternative to, the seal bag assemblies 118 and labyrinth chamber 118c. Such other separation mechanisms include pistons, labyrinths and bellows.

The seal section 112 further includes a plurality of mechanical shaft seals 120, a head 122 configured for connection to the pump assembly 108 (not shown in FIG. 2), and a base 124 configured for connection to the motor assembly 110 (not shown in FIG. 2). The head 122 and base 124 are preferably configured for a locking threaded engagement with the housing 114. The mechanical shaft seals 120 are positioned along the shaft 116 and limit the migration of fluid along the shaft 116.

The seal section 112 further includes a thrust bearing assembly 126. The thrust bearing assembly 126 includes a down thrust bearing 128, a thrust runner 130, an up thrust bearing 132 and a thrust bearing housing 134. The down thrust bearing 128 is supported in a stationary manner by the base 124. The thrust runner 130 is connected to the shaft 116 between the down thrust bearing 128 and up thrust bearing 132. The thrust runner 130 is configured to rotate in very close proximity to the down thrust bearing 128 and up thrust bearing 132. The thrust bearing housing 134 contains the internal components of the thrust bearing assembly 126. The thrust bearing housing 134 is connected to the base 124 on one end and to a guide body 136 on the opposite end. As noted in FIG. 2, the guide body 136 contains shaft bearings 138 to control the radial movement of the shaft 116.

Figure 3:
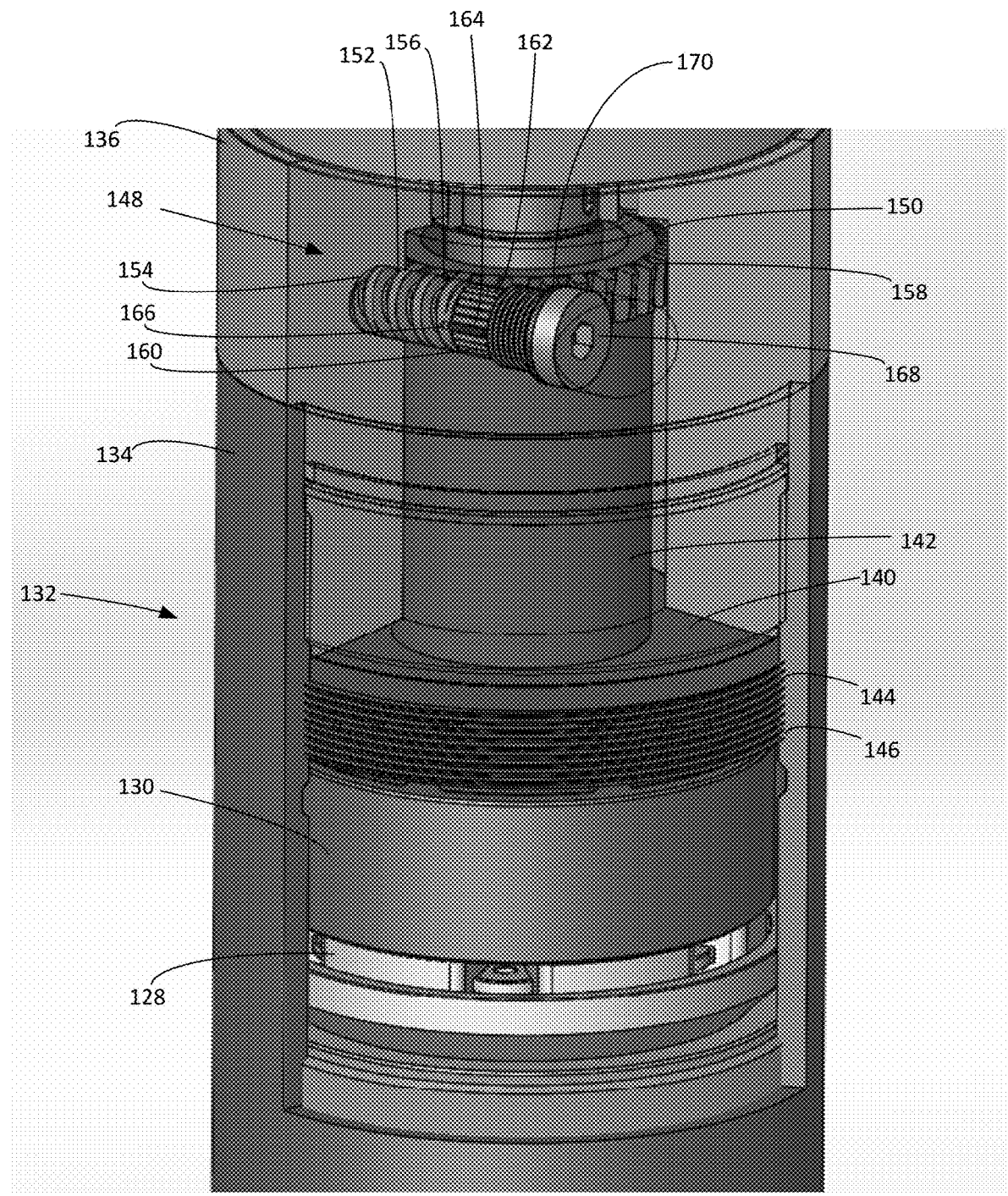
FIG. 3 is a close-up, perspective and partial cross-sectional view of the thrust bearing assembly of the seal section of FIG. 2.
Figure 4:
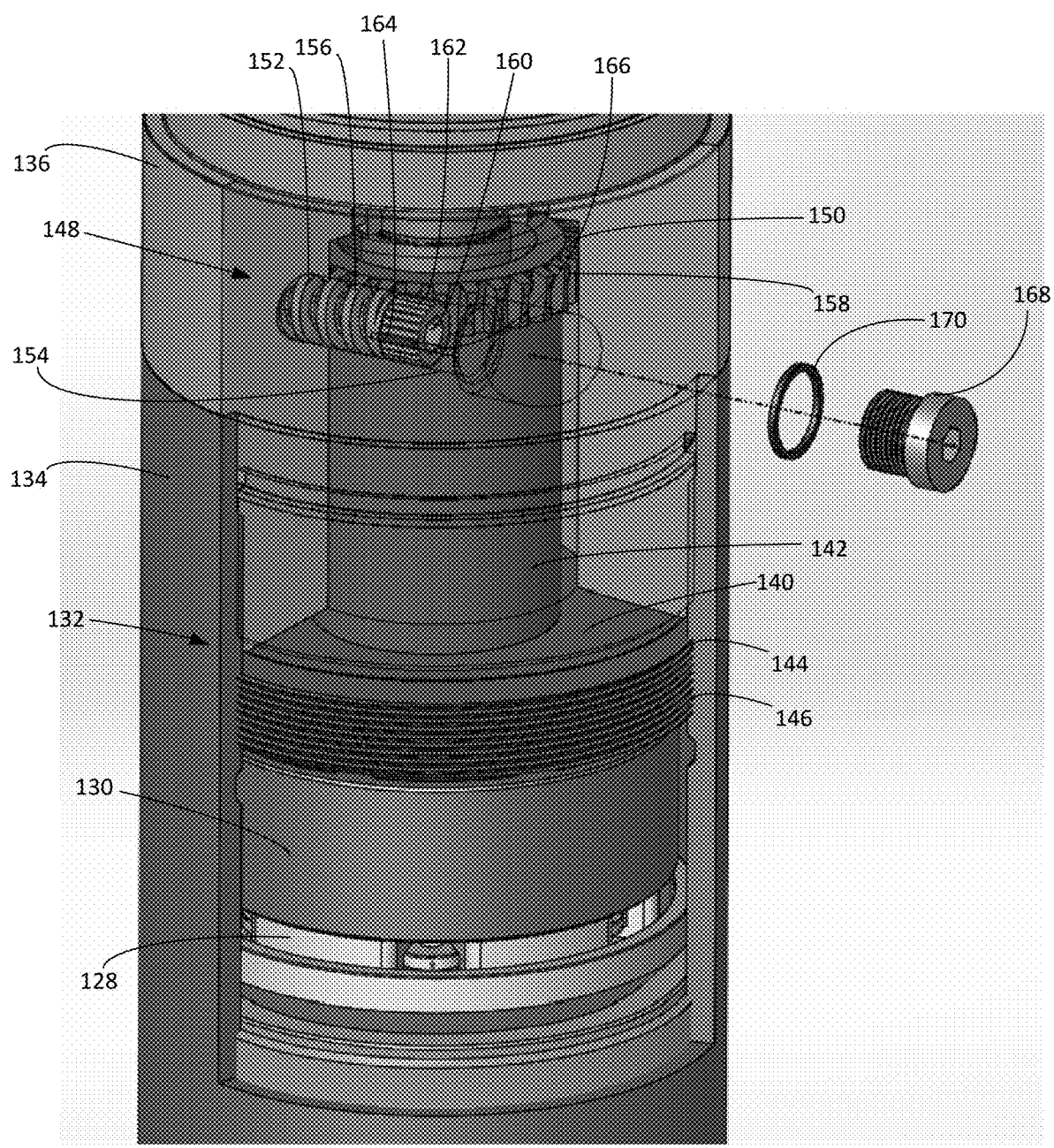
FIG. 4 is a close-up, perspective and partial cross-sectional view of the thrust bearing assembly of the seal section of FIG. 2 with the worm gear assembly in an exploded view.

Referring now also to FIGS. 3 and 4, the up thrust bearing 132 includes a body 140 and a neck 142. The threaded body 140 includes body threads 144 that mate with corresponding housing threads 146 along the interior of the thrust bearing housing 134. The body threads 144 and housing threads 146 are configured such that the selective rotation of the up thrust bearing 132 within the thrust bearing housing 134 causes the up thrust bearing 132 to either reduce or increase the distance between up thrust bearing 132 and the thrust runner 130. The neck 142 is connected to, or unitary with, the body 140 of the up thrust bearing 132 and extends into the guide body 136.

The up thrust bearing 132 further includes an external positional adjustment mechanism. In the embodiment depicted in FIG. 2, the up thrust bearing 132 includes a worm gear assembly 148 that includes a wheel gear 150 rigidly connected to the neck 142 and a worm screw 152 contained within a worm bore 154 within the guide body 136. The worm screw 152 includes worm threads 156 that are configured to mate with corresponding gear teeth 158 on the wheel gear 150. The worm screw 152 further includes an adjustment head 160. The adjustment head 160 is configured to be engaged by a suitable tool, such as an Allen wrench or screwdriver, for the purpose of selectively rotating the worm screw 152 within the worm bore 154.

The worm gear assembly 148 further includes a locking mechanism. In one embodiment, the adjustment head 160 includes a series of external splines 162 that are sized to accept a locking pin 164. A corresponding locking pin slot 166 is located in the worm bore 154 of the guide body 136. Placing the locking pin 164 into the locking pin slot 166 and between two of the splines 162 prevents the worm screw 152 from rotating. Removing the locking pin 164 frees the worm screw 152 so that is can be rotated within the worm bore 154. The worm gear assembly 148 may also include a plug 168 and seal 170. The plug 168 is configured for threaded engagement within the external portion of the worm bore 154. When engaged, the plug 168 and seal 170 prevent fluid inside the thrust bearing housing 134 from draining out the worm bore 154.

When the worm screw 152 is engaged with the wheel gear 150, the rotation of the worm screw 152 causes the wheel gear 150 and up thrust bearing 132 to rotate within the thrust bearing housing 134. As it rotates, the up thrust bearing 132 moves up or down in the thrust bearing housing 134. This, in turn, changes the distance between the up thrust bearing 132 and the thrust runner 130. In some embodiments, the worm gear assembly 148 and the body threads 144 are configured such that several full rotations of the worm screw 152 produce a small degree of rotation in the body 140 of the up thrust bearing 132. This facilitates the fine adjustment of the spacing between the up thrust bearing 132 and the thrust runner 130. Notably, the gear teeth 158 and worm threads 156 are sized and configured such that axial movement of the up thrust bearing 132 does not disengage the worm screw 152 from the wheel gear 150.

During assembly, the down thrust bearing 128 is placed into position within the thrust bearing housing 134. The thrust runner 130 can then be placed into position and secured to the shaft 116. Next, the up thrust bearing 132 is placed into the thrust bearing housing 134 and threaded into an initial position adjacent the thrust runner 130. The guide body 136 can then be connected to the thrust bearing housing 134. The guide body 136 is sized and configured to provide a clearance fit with the up thrust bearing 132. The worm screw 152 can then be inserted into the worm bore 154 and rotated into engagement with the wheel gear 150.

Using an appropriate tool engaged with the adjustment head 160, the worm screw 152 can be turned to rotate the wheel gear 150 and the balance of the up thrust bearing 132. Using the worm gear assembly 148, the up thrust bearing 132 can be into an adjusted position relative to the thrust runner 130. Thus, the thrust bearing assembly 126 can be adjusted after the thrust bearing assembly 126 has been fully assembled or even after the entire seal section has been assembled, tested and operated. Once the up thrust bearing 132 has been placed into the desired position relative to the thrust runner 130, the locking pin 164 can be inserted into the locking pin slot 166 and splines 162 of the adjustment head 160 to prevent any further movement in the up thrust bearing 132.

Thus, exemplary embodiments include adjustment methods and adjustment mechanisms for setting the spacing between the up thrust bearing 132 and the thrust runner 130 of the thrust bearing assembly 126. The adjustment mechanism includes the cooperated use of the worm gear assembly 148 and the threaded engagement of the up thrust bearing 132 with the thrust bearing housing 134. The methods and mechanisms disclosed herein permit the precise external adjustment of the spacing between the internal components of the thrust bearing assembly 126 within the pumping system 100. In some embodiments, the up thrust bearing 132 can be positioned within 0.020 to 0.031 inches of the thrust runner 130.

Although the adjustment mechanisms have been described in connection with a thrust bearing assembly, the same mechanisms can be used to control the spacing between other systems that include a rotating component positioned adjacent to one or two stationary bearings. Furthermore, although the thrust bearing assembly 126 has been described in connection with a submersible pumping system 100, it will be appreciated that the thrust bearing assembly 126 and corresponding adjustment mechanisms can also be used in surface pumping systems.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A downhole submersible pumping system comprising:
    a shaft within the downhole submersible pumping system;
    one or more shaft seals; wherein each of the one or more shaft seals is disposed along the shaft;
    a thrust bearing assembly, wherein the thrust bearing assembly comprises:
        a thrust runner connected to the shaft;
        an up thrust bearing adjacent to the thrust runner; and
        an adjustment mechanism for adjusting the distance between the up thrust bearing and the thrust runner;
        wherein the adjustment mechanism comprises a worm gear assembly that comprises:
            a wheel gear connected to the up thrust bearing; and
            a worm screw that is engaged with the wheel gear such that rotation of the worm screw causes the wheel gear and up thrust bearing to rotate.

2. The downhole submersible pumping system of claim 1 further comprising a guide body that includes a worm bore that extends to an exterior of the guide body, wherein the worm screw is retained within the worm bore.

3. The downhole submersible pumping system of claim 1, wherein the worm screw includes an adjustment head that can be externally manipulated to rotate the worm screw.

4. The downhole submersible pumping system of claim 3, wherein the worm gear assembly further comprises a lock to selectively prevent the worm screw from rotating.

5. A downhole submersible pumping system comprising:
    a shaft within the downhole submersible pumping system;
    one or more shaft seals; wherein each of the one or more shaft seals is disposed along the shaft;
    a thrust bearing assembly, wherein the thrust bearing assembly comprises:
        a thrust runner connected to the shaft;
        an up thrust bearing adjacent to the thrust runner;
        an adjustment mechanism for adjusting the distance between the up thrust bearing and the thrust runner; and
        wherein the thrust bearing assembly further comprises a thrust bearing housing that includes housing threads, and wherein the up thrust bearing includes bearing threads that can be engaged with the housing threads such that rotation of the up thrust bearing within the thrust bearing housing moves the up thrust bearing up or down within the thrust bearing housing.

6. A pumping system comprising:
    a motor;
    a shaft driven by the motor;
    a pump driven by rotation of the shaft;
    a thrust bearing housing; and
    a thrust bearing assembly contained within the thrust bearing housing, wherein the thrust bearing assembly comprises:
        a rotating component connected to the shaft;
        a first bearing adjacent to the rotating component; and
        an adjustment mechanism for adjusting the distance between the rotating component and the first bearing, wherein the adjustment mechanism can be manipulated from outside the thrust bearing housing, wherein the adjustment mechanism comprises a worm gear assembly that comprises:
            a wheel gear connected to the up thrust bearing; and
            a worm screw that is engaged with the wheel gear such that rotation of the worm screw causes the wheel gear and up thrust bearing to rotate.

7. The pumping system of claim 6, wherein the rotating component is a thrust runner.

8. The pumping system of claim 6, wherein the first bearing is an up thrust bearing.

9. The pumping system of claim 6, wherein the worm screw includes an adjustment head that can be externally manipulated to rotate the worm screw.

10. The pumping system of claim 9, wherein the worm gear assembly further comprises a lock to selectively prevent the worm screw from rotating.

11. The pumping system of claim 10, wherein the up thrust bearing comprises a body and a neck, and wherein the wheel gear is connected to the neck of the up thrust bearing.

12. The pumping system of claim 6, wherein the thrust bearing assembly further comprises a second bearing and wherein the rotating component is positioned between the first bearing and the second bearing.

13. The pumping system of claim 6, further comprising a seal section, wherein the seal section contains the thrust bearing housing and one or more seal bag assemblies.

14. A pumping system comprising:
    a motor;
    a shaft driven by the motor;
    a pump driven by the shaft;
    a thrust bearing housing; and a thrust bearing assembly contained within the thrust bearing housing, wherein the thrust bearing assembly comprises:
 a rotating component connected to the shaft;
 a first bearing adjacent to the rotating component;
 an adjustment mechanism for adjusting the distance between the rotating component and the first bearing, wherein the adjustment mechanism can be manipulated from outside the thrust bearing housing; and
 wherein the thrust bearing housing includes internal housing threads, and wherein the up thrust bearing includes bearing threads that can be engaged with the housing threads such that rotation of the up thrust bearing within the thrust bearing housing moves the up thrust bearing up or down within the thrust bearing housing.

15. A downhole submersible pumping system comprising:
 a shaft within the downhole submersible pumping system;
 one or more shaft seals; wherein each of the one or more shaft seals is disposed along the shaft; and
 a thrust bearing assembly, wherein the thrust bearing assembly comprises:
  a thrust runner connected to the shaft;
  an up thrust bearing adjacent to the thrust runner; and
  adjustment means for adjusting the distance between the up thrust bearing and the thrust runner.

16. The downhole submersible pumping system of claim 15, wherein the thrust bearing assembly further comprises a down thrust bearing and wherein the rotating component is positioned between the up thrust bearing and the down thrust bearing.

17. The downhole submersible pumping system of claim 15, wherein the thrust bearing assembly further comprises locking means for preventing the adjustment means from adjusting the distance between the up thrust bearing and the thrust runner.

18. The pumping system of claim 13, wherein the adjustment mechanism can be manipulated from outside the seal section.

* * * * *